UNITED STATES PATENT OFFICE.

FRANKLIN R. CARPENTER, OF DENVER, COLORADO.

PROCESS OF MAKING FERRO-NICKEL AND NICKEL-STEEL.

No. 922,388.　　　　Specification of Letters Patent.　　Patented May 18, 1909.

Application filed February 24, 1909. Serial No. 479,776.

*To all whom it may concern:*

Be it known that I, FRANKLIN R. CARPENTER, a citizen of the United States, residing at Denver, in the county of Denver and the State of Colorado, have invented certain new and useful Improvements in Processes of Making Ferro-Nickel and Nickel-Steel, of which the following is a full, clear, and exact description.

My invention relates to ores carrying copper, nickel and iron in the sulfid form and especially to the pyrrhotite ores such as are found in Sudbury, in the Province of Ontario, in the Dominion of Canada. These ores carry from 1% to 6% copper and about the same percentage of nickel, and when fairly free from rock, from 50% to 60% iron. The present method of their treatment is expensive and very wasteful in that the iron is lost and the matte to which the ore is smelted is difficult to treat as the copper and nickel must be separated before the nickel can be used in the manufacture of ferro-nickel or nickel-steel.

To meet these difficulties, and to render the iron a source of profit I have devised the following process: The pyrrhotite carrying copper and nickel is freed as far as convenient from the accompanying gangue, then crushed, if need be, and given an oxidizing roast in any well known furnace whereby nickel and iron are oxidized and the copper remains unchanged, while the sulfur passes off as sulfur dioxid. The sulfurous fumes may be used in the manufacture of sulfuric acid or otherwise utilized. The product of this roast is then treated by the Longmaid-Henderson process, i. e., it is mixed with a proper percentage of common salt and given a chloridizing roast and the chloridized copper leached, preferably with hot water, from the remaining ore. If the operation has been properly conducted, at least 95% of the copper and little or no nickel, may be extracted with hot water from the residues which are now essentially the purple iron ore, or "blue billy" of commerce, save that these residues will carry practically all the original nickel and little or no copper. The small percentage of the original copper which may not be extracted by hot water because in the form of oxids, may be recovered by leaching with a weak solution of hydrochloric acid, which may also dissolve a little nickel, but which can be recovered with the dissolved copper. In extreme cases this loss of nickel is found to be very small in amount. The principle of the process depends upon the fact that when the three metals,—copper as sulfid and nickel and iron as oxids are given a chloridizing roast, copper is chloridized and nickel and iron remain unchanged, and the copper is thus made soluble in water. This process is one of such accuracy that not more than one-tenth of one per cent. copper or fifteen-hundredths of one per cent. sulfur will remain in the residue. After this treatment the nickel-iron residue is smelted directly with or without other iron ores, but with proper fluxes for ferro-nickel, or made into nickel-steel, thereby saving the cost of separating the nickel by the present costly methods and the complete utilization of the iron.

Having thus described my invention, what I claim is:

1. The method of freeing sulfid copper-nickel-iron ores from their copper contents by oxidizing the nickel and iron sulfids and then chloridizing the copper sulfid and leaching the same from the mass, leaving the nickel and iron oxids in the form of the purple ore of commerce, and the smelting of this purple ore for the production of ferro-nickel or nickel-steel, substantially as described.

2. The method of freeing sulfid copper-nickel-iron ores from their copper contents by oxidizing the nickel and iron sulfids and then chloridizing the copper sulfid, leaving the nickel and iron oxids in the form of the purple ore of commerce.

3. The method herein described which consists in giving to sulfid copper-nickel-iron ores an oxidizing roast to oxidize the nickel and iron, then giving it a chloridizing roast to chloridize the copper sulfid whereby the copper is rendered soluble in water while the iron and nickel oxids are not so affected, then leaching or washing from the ore the chloridized copper, and leaving the remainder in the form of "blue billy" or purple iron ore carrying practically all the original nickel and little or no copper, and then smelting such purple nickel-carrying ore for the production of ferro-nickel or nickel-steel.

In testimony whereof, I have hereunto subscribed my name.

FRANKLIN R. CARPENTER.

Witnesses:
M. A. McCOLLOM,
A. L. PEARSE.